April 14, 1925.

R. C. ZANON 1,533,492

MOWING ATTACHMENT FOR TRACTORS

Filed Aug. 31, 1920     2 Sheets-Sheet 1

INVENTOR
Remo C. Zanon
BY *(signature)* ATTORNEY

April 14, 1925.   1,533,492
R. C. ZANON
MOWING ATTACHMENT FOR TRACTORS
Filed Aug. 31, 1920   2 Sheets-Sheet 2
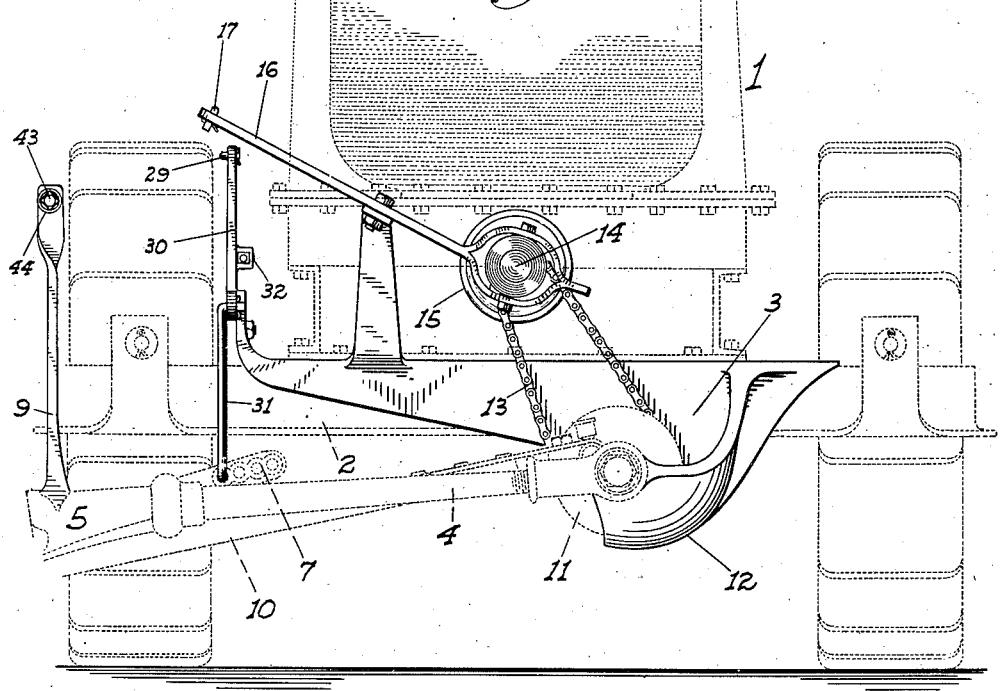
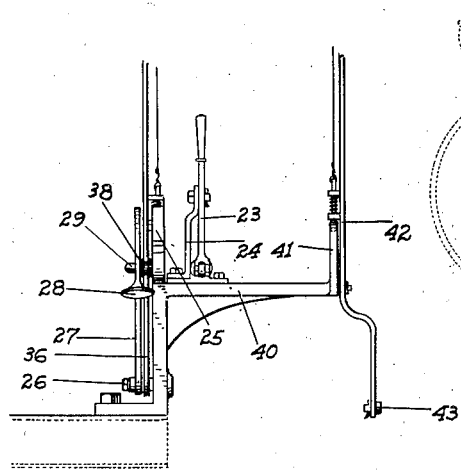
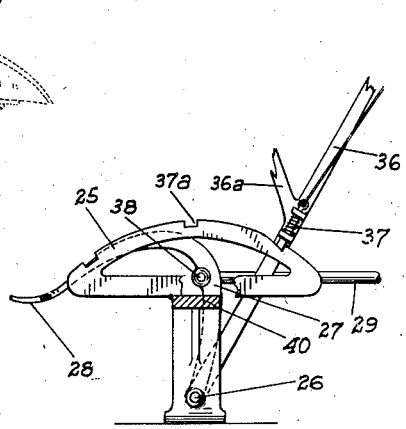
INVENTOR
Remo C. Zanon
BY  ATTORNEY Patented Apr. 14, 1925.

1,533,492

UNITED STATES PATENT OFFICE.

REMO C. ZANON, OF MODESTO, CALIFORNIA, ASSIGNOR OF ONE-HALF TO JOHN J. FERLIN, OF MODESTO, CALIFORNIA.

MOWING ATTACHMENT FOR TRACTORS.

Application filed August 31, 1920. Serial No. 407,248.

*To all whom it may concern:*

Be it known that I, REMO C. ZANON, a citizen of the United States, residing at Modesto, in the county of Stanislaus, State of California, have invented certain new and useful Improvements in Mowing Attachments for Tractors; and I do declare the following to be a full, clear, and exact description of the same, reference being had to the accompanying drawings, and to the characters of reference marked thereon, which form a part of this application.

This invention relates to improvements in mowing attachments for tractors, the principal object of the invention being to provide a means whereby a standard form of mower may be attached to and driven by the power plant of the tractor and preferably at the forward end thereof, so that the driver of the tractor has the mower in full view all the time.

Another object is to provide means for manipulating the sickle bar of the mower and the teeth thereof from the seat on the tractor, so that one man may readily run both the tractor and the mower.

A further object is to provide a means for automatically cutting off the power from the mower when the sickle bar of the latter is raised beyond a certain point.

With the use of my device, the need of horses is of course eliminated, and crops can be mowed with a minimum of time, labor and expense.

Owing to the visibility of the mower at all times, and the means provided for readily raising the same, the stalling of the sickle in heavy or tough growths, and against obstructions on the ground, is obviated.

Also the device, when once applied, may be removed and again attached in a very short period of time.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 2 is a front view of a tractor showing particularly the mower attaching means.

Fig. 3 is a rear end view of the operating levers in connection with a clutch-throw means.

Fig. 4 is a side elevation of the same, certain parts being removed.

Figure 1:
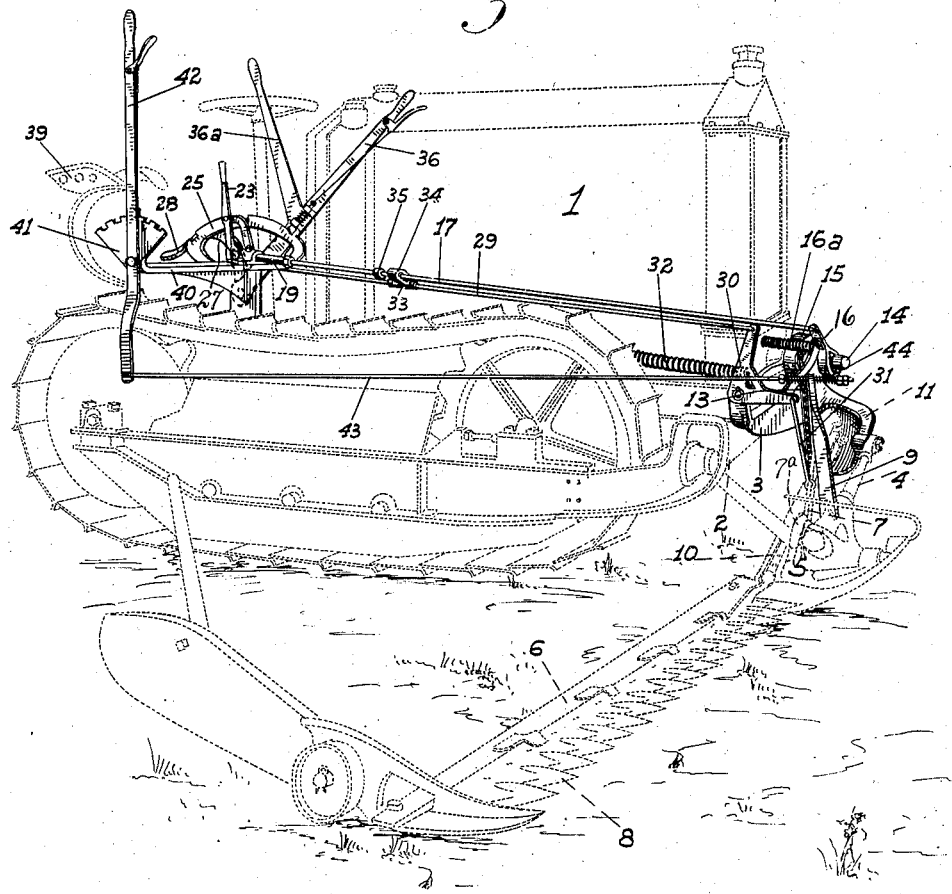
Fig. 1 is a perspective outline of a tractor showing a mower attached thereto, the features of my invention being shown in full lines and the remainder in dotted lines.
Figure 6:
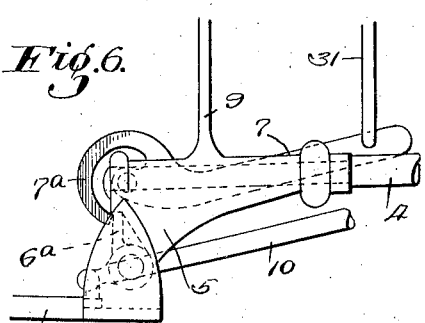
Figure 6 is a fragmentary front and end view of the mower structure.
Figure 5:
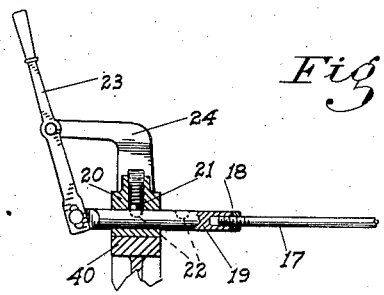
Fig. 5 is a fragmentary view of a clutch actuating rod, showing a catch means thereon.

Referring now more particularly to the characters of reference on the drawings, the numeral 1 denotes a tractor of any of the standard types, having a transverse forward-end frame beam 2.

To this beam is fixed a support 3, preferably a one-piece casting, in which is pivotally mounted in the longitudinal plane of the tractor, a bar 4 which extends to one side of the tractor, at which end a mower structure 5 is turnably mounted thereon.

This mower structure, together with the bar 4, is of a standard type, and includes a finger bar 6 pivoted on the structure 5 and having a vertical extension 6ª which is engaged by the hooked end 7ª of a pivoted arm 7, on raising the inner end of which the bar is raised about its connection with the mower structure.

The finger bar is provided with the usual fingers 8, and to tilt the fingers in a vertical plane lengthwise of the line of the travel, the finger bar is arranged to be tilted by an arm 9.

The teeth are arranged to be reciprocated by means of a pitman 10 eccentrically connected to a wheel or crank 11 journaled in the support 3 and preferably in alinement with the pivotal connection of the bar 4 therewith.

The member 11 is prevented from striking obstructions by means of a hood 12 formed with the support 3.

The construction of the mower just described is common to certain types of such implements, and in itself forms no part of my invention.

The wheel 11 is driven by a chain 13 which is itself driven from the crank shaft 14 of the power plant of the tractor, which usually projects beyond the forward frame.

A friction clutch 15 is mounted on the shaft 14 and is arranged to transmit, or withhold the driving power from the chain. This clutch is actuated by means of a lever member 16 pivoted to the member 3, and having an operating rod 17 attached thereto which extends rearwardly to, and is mounted for longitudinal adjustment as at 18 in a member 19 slidable in a fixed sleeve 20, this sleeve being provided with a spring pressed pin 21 arranged to engage either at a time of a pair of recesses 22 in the member 19. A handle 23 is connected to the end of the member 19 beyond the sleeve, and is pivoted to a bracket 24.

The clutch is so arranged that a rearward movement of the rod 17 disengages the same.

A quadrant 25 is mounted on the frame of the tractor, below which is a transverse shaft 26 to which is fixed an arm 27, which extends upwardly to said quadrant, and then curves down and rearwardly to a pedal 28. To the arm 27 is connected a rod 29 extending forwardly to the upper arm of a bell crank 30 pivoted to the member 3, the other arm of said bell crank being flexibly connected to the arm 7 by a rod 31.

The power necessary to pull this rod is relieved somewhat by a tension spring 32 connected to the tractor and to the bell crank.

The rod 29 extends substantially parallel to the rod 17, and has adjustably fixed thereon a sleeve 33 having a slotted arm 34 passing over the rod 17, the latter having a fixed collar 35 a certain distance behind said arms.

A lever 36 is turnably mounted on the shaft 26 and extends upwardly alongside the quadrant 25, having a catch mechanism 37 thereon to engage the notches 37ª of the quadrant, of which there are only three. This lever is positioned between the quadrant and the pedal-arm 27, and is adapted to bear against a projection 38 on said pedal-arm, behind the said lever.

Since when this lever is moved to its furthest forward position the handle and the catch-trigger thereon cannot be readily reached from the seat 39 of the tractor, it is provided with an auxiliary arm 36ª projecting upwardly therefrom and substantially vertical when the lever 36 is forward, so that said lever may be pulled back to the middle notch without the driver leaving his seat.

To permit of this being done, the forward quadrant-notch is so shaped that it is not necessary to manipulate the catch mechanism 37 to release the same from said notch.

The operation of the pedal and lever structure is as follows:

When the pedal 28 is depressed, the rod 29 is moved rearwardly and the rod 31 upwardly, causing the finger-bar to be raised by the arm 7 as previously described just sufficiently that the outer end will be capable of clearing any possible obstructions, this outer end being non-supported and therefore relatively weak. This is accomplished without disturbing the driving of the chain 13 which operates the pitman, since the sleeve arm 34 does not strike against the collar 35 on the clutch-rod 17.

The construction of mowers is such however that a continued movement of the arm 7 operates to raise the finger bar and the entire mower structure clear of the ground. When this is done it is not desirable nor practical that the pitman shall continue in operation, since the parts are thrown out of proper alinement.

The entire raising of the sickle bar, to any extent desired, is done by the lever 36, and after the lever has moved a certain distance, said lever engages the member 38 on the pedal-arm, forcing the same back, and of course the rod 29 likewise. The sleeve 34 then engages the collar 35, causing the rod to move back to throw out the clutch, this action being aided by a suitable spring 16ª fixed to the member 16, and the clutch will of course remain disengaged until it is again thrown in by hand, after the lever has been returned to its normal position.

With the double pedal-and-lever operating means for the finger bar, the lever will not be disturbed by any vibratory or other slight movement imparted to the rod 29 by the movement of the finger bar over uneven ground.

A bar 40 formed with the quadrant 25 projects over the wheels or tracks of the tractor, and carries at its outer end a quadrant 41 with which a lever 42 is adapted to engage, said lever having a rod 43 connected to its lower end and extending to the arm 9 of the mower structure 5 which controls the tilting of the sickle-bar, said structure being turnably or pivotally mounted on the bar 4, as hereinbefore stated. Springs 44 are on said rod on both sides of the arm, so that the sickle-bar is permitted a certain flexibility of movement without disturbing the lever or tending to bend the rod.

From the foregoing description it will be readily seen that I have produced such a device as substantially fulfills the object of the invention as set forth herein.

While this specification sets forth in detail the present and preferred construction of the device still in practice such deviations from such detail may be resorted to as do not form a departure from the spirit of the invention, as defined by the appended claims.

Having thus described my invention what I claim as new and useful and desire to secure by Letters Patent is:

1. A mowing attachment for tractors comprising a cutting mechanism, means for attaching said mechanism to the tractor, means for enabling said mechanism to be tilted in a vertical plane lengthwise of the line of travel, an arm projecting up from the cutting mechanism, a lever mounted on the tractor, a rod extending therefrom to the arm and passing freely through the latter, and counteracting springs on the rod on opposite sides of the arm and bearing thereagainst, whereby the cutting mechanism may have a certain amount of tilting movement without disturbing the lever.

2. A mowing attachment for tractors comprising a cutting mechanism, means for attaching said mechanism to the tractor, means for enabling said mechanism to be swung to a vertical position transversely of the tractor, a driving mechanism adapted to be interposed between said cutting mechanism and the power plant of the tractor, a clutch interposed in said driving mechanism, a rod to operate said clutch, an arm projecting upwardly from the cutting mechanism, another rod, means between said latter rod and the arm whereby a horizontal movement of said rod will effect the raising of the cutting mechanism, means for moving both said rods in the same direction to open the clutch and raise the cutting mechanism, a sleeve fixed on the latter rod and having arms embracing the first named rod, and a collar on said first named rod beyond the sleeve-arms in the direction of rearward movement of the rods, said arms abutting against the collar after a predetermined travel of the former.

3. A mowing attachment for tractors comprising a cutting mechanism, means for attaching said mechanism to the tractor, means for enabling said mechanism to be swung to a vertical position transversely of the tractor, means for driving said mechanism from the tractor, an arm connected to the cutting mechanism and arranged to be pulled to raise the same, a pedal, a rod connected to the pedal, means connecting said rod to the arm, a lever pivoted to one side of the pedal, and a projection on the pedal behind the lever and in the path of movement thereof.

4. A mowing attachment for tractors comprising a cutting mechanism, means for attaching said mechanism to a tractor, means for enabling said mechanism to be swung to a vertical position transversely of the tractor, a driving mechanism interposed between said cutting mechanism and the power plant of the tractor, a clutch interposed in said driving mechanism, a rod to operate said clutch and arranged to normally hold the same engaged, an arm controlling the raising of the cutting mechanism, a lever, a rod connected at one end to the lever, means connecting the other end of the rod to the arm, and cooperating means between said rods for automatically throwing the clutch out after the lever has been moved a predetermined distance.

5. A mowing attachment for tractors comprising a cutting mechansm, means for attaching said mechanism to a tractor, means for enabling said mechanism to be swung to a vertical position transversely of the tractor, a driving mechanism interposed between said cutting mechanism and the power plant of the tractor, a normally engaged clutch interposed in the driving mechanism, means for disengaging the clutch, hand actuated means for controlling the raising of the cutting mechanism, and cooperating means between said two first named means for automatically causing the clutch to be disengaged after the hand actuated means has been operated to a predetermined extent.

In testimony whereof I affix my signature.

REMO C. ZANON.